United States Patent
Lee et al.

(10) Patent No.: US 10,268,040 B2
(45) Date of Patent: Apr. 23, 2019

(54) DISPLAY BOX

(71) Applicant: Coretronic Corporation, Hsin-Chu (TW)

(72) Inventors: Hsin-Hung Lee, Hsin-Chu (TW);
Kuo-Lung Lin, Hsin-Chu (TW);
Ko-Wei Chien, Hsin-Chu (TW);
Ho-Kuei Chen, Hsin-Chu (TW);
Chiao-Chih Yang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 231 days.

(21) Appl. No.: 15/466,882

(22) Filed: Mar. 23, 2017

(65) Prior Publication Data
US 2017/0285342 A1    Oct. 5, 2017

(30) Foreign Application Priority Data

Apr. 1, 2016    (TW) .............................. 105110439 A

(51) Int. Cl.
| | | |
|---|---|---|
| *G02B 27/01* | (2006.01) | |
| *G02B 27/14* | (2006.01) | |
| *G02B 27/10* | (2006.01) | |
| *F21V 8/00* | (2006.01) | |

(Continued)

(52) U.S. Cl.
CPC ....... *G02B 27/0149* (2013.01); *G02B 6/0008* (2013.01); *G02B 6/0096* (2013.01); *G02B 27/0101* (2013.01); *G06F 1/1626* (2013.01); *G06F 1/181* (2013.01); *G02B 27/144* (2013.01); *G02B 2027/0138* (2013.01); *G02B 2027/0159* (2013.01)

(58) Field of Classification Search
CPC .. G02B 27/0149; G02B 27/144; G02B 27/10; G02B 27/0101; G02B 2027/0149; G02B 2027/0138; G06F 1/1626; G06F 1/181; G06F 1/16
USPC ......................................... 359/630
See application file for complete search history.

(56) References Cited

U.S. PATENT DOCUMENTS

| | | |
|---|---|---|
| 6,563,648 B2 | 5/2003 | Gleckman et al. |
| 8,230,992 B2 | 7/2012 | Law et al. |
| 2003/0181225 A1 | 9/2003 | Hasegawa et al. |

(Continued)

FOREIGN PATENT DOCUMENTS

| | | |
|---|---|---|
| CN | 203721156 | 7/2014 |
| CN | 104243962 | 12/2014 |

(Continued)

*Primary Examiner* — William C. Dowling
(74) *Attorney, Agent, or Firm* — JCIPRNET

(57) ABSTRACT

A display box is capable of supporting an electronic device. The electronic device is capable of emitting an image beam. A display box includes a box, a light-transmitting plate and a pivoting carrier. The box has a top-side opening and a viewing opening. The light-transmitting plate is obliquely arranged in the box and is capable of reflecting the image beam passing through the viewing opening to a target. The pivoting carrier has an accommodating recess and a first pivot axis. The pivoting carrier is disposed on the box. The pivoting carrier is pivoted beside the top-side opening by the first pivot axis. The electronic device is disposed in the accommodating recess, wherein the pivoting carrier rotates by the first pivot axis to make the electronic device face different positions.

10 Claims, 6 Drawing Sheets

(51) Int. Cl.
*G06F 1/16* (2006.01)
*G06F 1/18* (2006.01)

(56) References Cited

U.S. PATENT DOCUMENTS

2010/0067118 A1* 3/2010 Takahashi .............. G02B 27/01
359/633
2012/0026425 A1* 2/2012 Kumaki ................. B60K 35/00
349/62
2012/0300275 A1* 11/2012 Vilardell ............... G06F 1/1626
359/32
2015/0271937 A1* 9/2015 Zheng .................... G06F 1/181
312/293.2

FOREIGN PATENT DOCUMENTS

| CN | 204896287 | 12/2015 |
| TW | M452347 | 5/2013 |
| TW | 201337433 | 9/2013 |
| TW | M492452 | 12/2014 |

* cited by examiner

DISPLAY BOX

CROSS-REFERENCE TO RELATED APPLICATION

This application claims the priority benefit of Taiwan application serial no. 105110439, filed on Apr. 1, 2016. The entirety of the above-mentioned patent application is hereby incorporated by reference herein and made a part of this specification.

BACKGROUND OF THE INVENTION

Field of the Invention

The invention relates to a display box, and more particularly, to a display box used for the augmented reality (or abbreviated as AR).

Description of Related Art

The augmented reality utilizes virtual images to perform the reality enhancement technology for real scenes. The objective of this kind of technology is to apply virtual images to the real world and perform interaction, thereby enhancing some effects of the real environment.

Traditionally, the display box used for the augmented reality directly makes the display surface of the electronic device cover the opening of the display box. The image providing by the display surface of the electronic device is reflected to the users through the light-transmitting plate in the display box. In the meanwhile, the ambient images of the real environment in the display box is also projected to the users through this light-transmitting plate so as to make the users watch the virtual images from the electronic device and the ambient images from the real environment, to achieve the effects of the augmented reality.

However, the aforementioned conventional display box derives the following problems. First of all, the operation interface of the electronic device is also a display surface. If making the display surface of the electronic device covers the opening of the display box, then the users may not use the touch-controlled operation which causes the use of inconvenience for the users. In addition, there is no light source inside the conventional display box which results in the weaker brightness of the ambient images inside the display box. Since the users simultaneously watch the virtual images and the ambient images, the aforementioned display box presents poor brightness uniformity of the image to the users. Intuitively, although additional light sources may be configured in the display box to enhance the brightness of the ambient images inside the display box. However, this approach which needs to configure additional power in the display box will increase production costs and make the manufacturing process of the display box complicated. Moreover, if the electronic device needs to capture the information of the graphic card, then it is necessary to make the lens of the electronic device focus on the information of the graphic card. And the approach of focus is usually making the graphic card manually move to have the lens focus on the graphic card. However, this kind of manually focus approach easily causes out of focus, and makes the electronic device unable to clearly identify the information of the graphic card. The efficiency of identification graphic card is lower.

The information disclosed in this "BACKGROUND OF THE INVENTION" section is only for enhancement of understanding of the background of the described technology, and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention provides a display box which provides the use of convenience for users.

The other objectives and advantages of the invention may be further understood through the technical features disclosed in the invention.

In order to achieve one or a portion of or all of the objects or other objects, an embodiment of the invention provides a display box which is capable of supporting an electronic device. The electronic device is capable of emitting an image beam. A display box includes a box, a light-transmitting plate and a pivoting carrier. The box has a top-side opening and a viewing opening. The light-transmitting plate is obliquely arranged in the box and is capable of reflecting the image beam passing through the viewing opening to a target. The pivoting carrier has an accommodating recess and a first pivot axis. The pivoting carrier is disposed on the box. The pivoting carrier is pivoted beside the top-side opening by the first pivot axis. The electronic device is disposed in the accommodating recess, wherein the pivoting carrier rotates by the first pivot axis to make the electronic device face different positions.

Based on the above, the embodiments of the invention have at least one of the advantages or effects below. The display box of the embodiments of the invention makes the electronic device face different positions by disposing the electronic device in the accommodating recess of the pivoting carrier, and rotating the pivoting carrier by the first pivot axis. According to the different needs of users, the users could achieve different effects (for example, performing augmented reality or performing operation to the electronic device) by rotating the pivoting carrier to make the electronic device face different positions. The actuation mode of the display box as the aforementioned plurality of the embodiments in the invention provides the intuitive method of operation for users. Therefore, the display box of the embodiments of the invention is easy to operate, and also provides the use of convenience for users.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
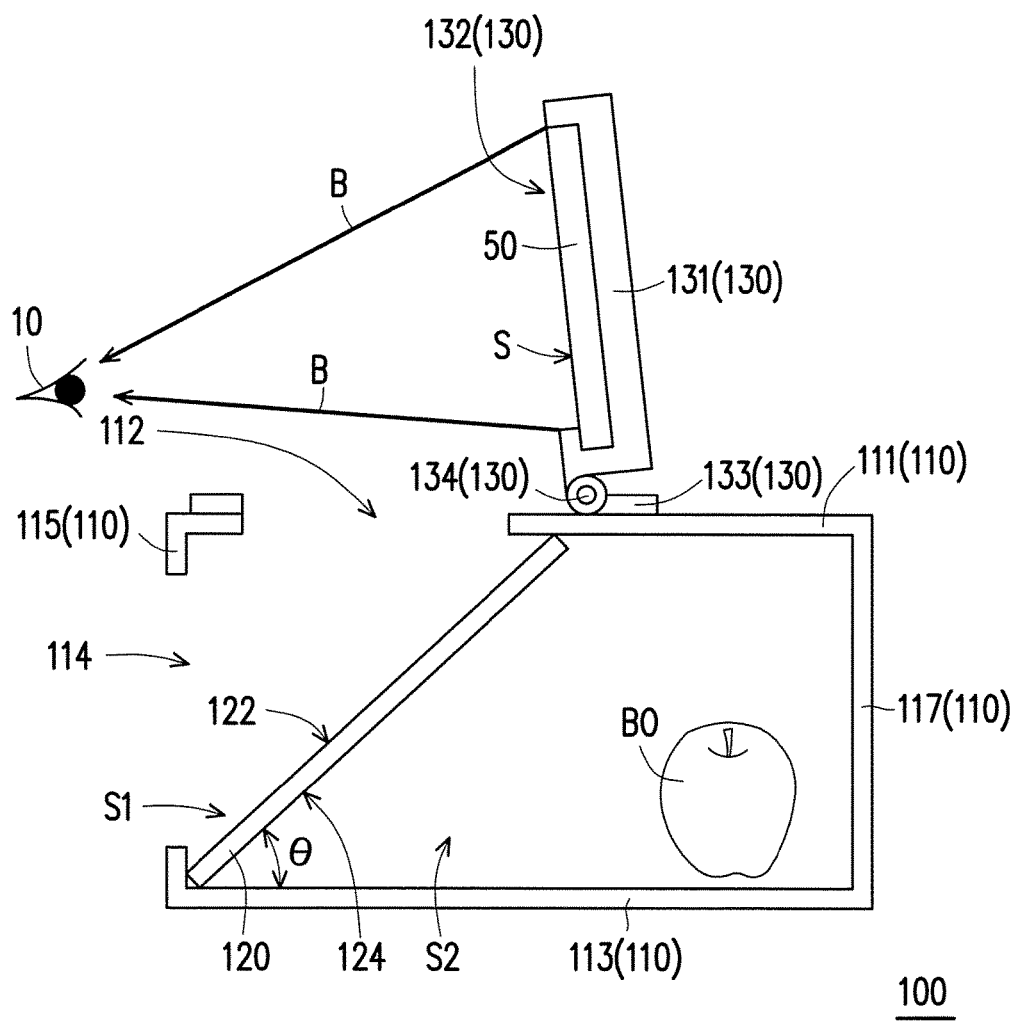
FIG. 1 is a cross-sectional schematic diagram of an embodiment of the invention.
Figure 2:
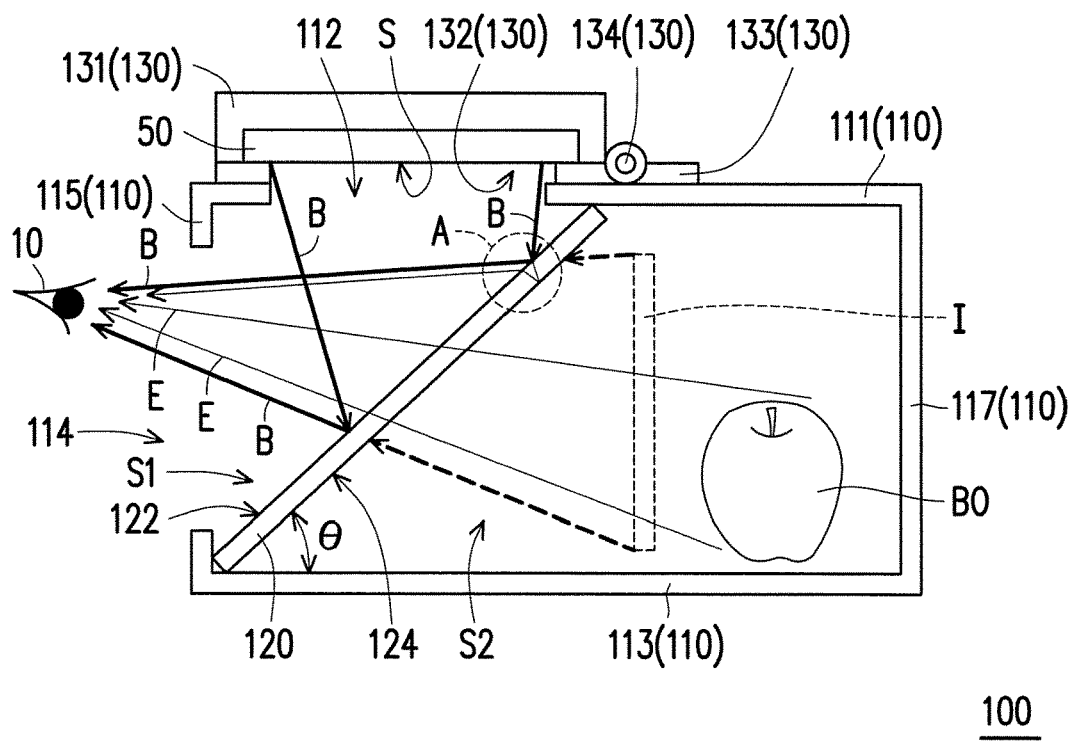
FIG. 2 is a cross-sectional schematic diagram when the electronic device shown in FIG. 1 faces the light-transmitting plate.
Figure 3:
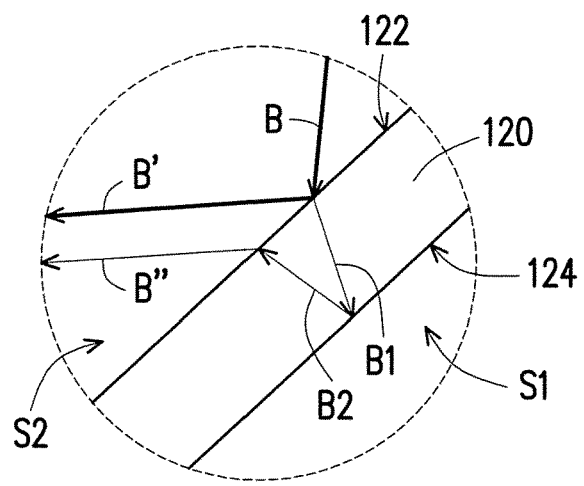
FIG. 3 is a schematic diagram enlarged view illustrating the A region depicted in FIG. 2.
Figure 4:
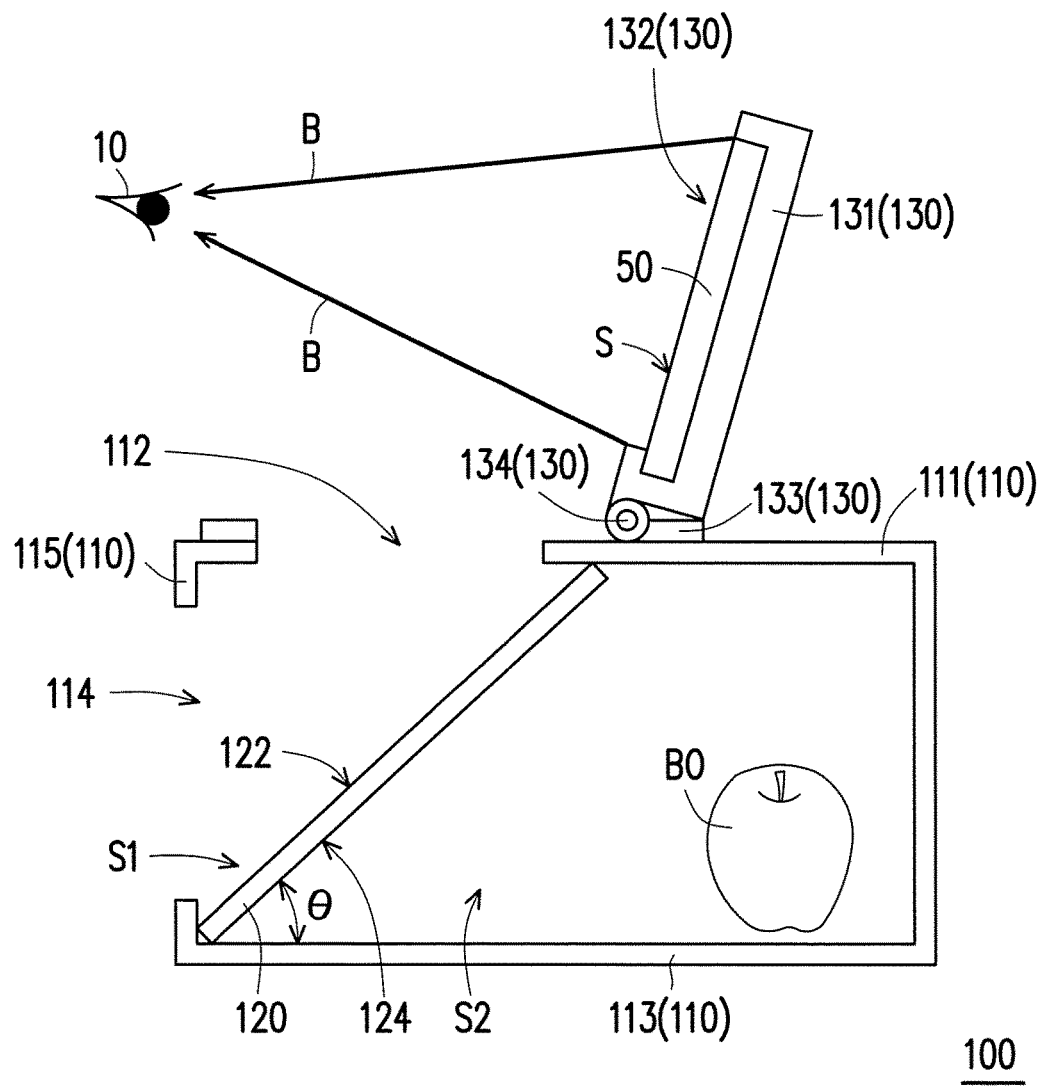
FIG. 4 is a cross-sectional schematic diagram when the electronic device shown in FIG. 1 faces the target.

FIG. 1 is a cross-sectional schematic diagram of an embodiment of the invention. FIG. 2 is a cross-sectional schematic diagram when the electronic device shown in FIG. 1 faces the light-transmitting plate. FIG. 3 is a schematic diagram enlarged view illustrating the A region depicted in FIG. 2. FIG. 4 is a cross-sectional schematic diagram when the electronic device shown in FIG. 1 faces the target.

Referring to FIG. 1, in the embodiment, the display box 100 is the display box used for the augmented reality and capable of supporting the electronic device 50, wherein the electronic device 50, for example, is the touch-controlled electronic device. The touch-controlled electronic device, for example, is the touch-controlled cell phone or touch-controlled tablet computer. The electronic device 50 is capable of emitting an image beam B. The image beam B is from the operation interface S of the electronic device 50, wherein the operation interface S, for example, is the display surface having the touch-controlled function.

Referring to FIG. 1 and FIG. 2, the display box 100 includes the box 110, the light-transmitting plate 120 and the pivoting carrier 130. The box 110 has the top-side opening 112 and the viewing opening 114. The light-transmitting plate 120 is obliquely arranged in the box 110 and is capable of reflecting the image beam B passing through the viewing opening 114 to a target 10 (not shown in FIG. 1, but shown in FIG. 2). The target 10, for example, is the eyes of the user. In the embodiment, the light-transmitting plate 120 has transmissive and reflective functions. The pivoting carrier 130 has an accommodating recess 132 and a first pivot axis 134. The pivoting carrier 130 is disposed on the box 110. The pivoting carrier 130 is pivoted beside the top-side opening 112 by the first pivot axis 134. The electronic device 50 is disposed in the accommodating recess 132. The pivoting carrier 130 rotates by the first pivot axis 134 to make the electronic device 50 face different positions.

In detail, in the embodiment, the box 110 has the top surface 111, the bottom surface 113 and two sides 115, 117. The top surface 111 is opposite to the bottom surface 113. Two sides 115, 117 connect to the top surface 111 and the bottom surface 113. The top surface 111 has the top-side opening 112. The side surface 115 has the viewing opening 114. In the embodiment, the light-transmitting plate 120, for example, is placed directly in the box 110 to make the range of the included angle θ between the light-transmitting plate 120 and the bottom surface 113 of the box 110 fall within 40 degree to 50 degree. However, the invention is not intent to limit the approach making the light-transmitting plate 120 disposed in the box 110. The light-transmitting plate 120, for example, may be adhered in the box 110, fixed by a stopper (not shown) in the box 110. The included angle θ between the light-transmitting plate 120 and the bottom surface 113 of the box 110, for example, is substantially 45 degree.

In the following paragraphs, the conditions that the pivoting carrier 130 rotates by the first pivot axis 134 to make the electronic device 50 face different positions will be specifically described.

Referring to FIG. 2 again. When the pivoting carrier 130 rotates by the first pivot axis 134 to make the electronic device 50 face the light-transmitting plate 120 (for example, the pivoting carrier 130 rotates by the first pivot axis 134 to make the electronic device 50 cover the top-side opening 112), the image beam B coming from the electronic device 50 transmits to the light-transmitting plate 120 passing through the top-side opening 112. The image beam B reflects by the light-transmitting plate 120. The image beam B reflected by the light-transmitting plate 120 passes through the viewing opening 114 to transmit to the target 10.

For example, a background object BO may be placed in the box 110 and an ambient beam E is coming from the background object BO. On the other hand, the light-transmitting plate 120 is capable of combining the image beam B and the ambient beam E. The light-transmitting plate 120 has a first side S1 and a second side S2 opposite to the first side S1. The target 10 is located at the first side S1 of the light-transmitting plate 120. The background object BO is located at the second side S2 of the light-transmitting plate 120. The ambient beam E transmits from the second side S2 of the light-transmitting plate 120 to the first side S1 of the light-transmitting plate 120 and projects from the viewing opening 114 to the target 10. The light-transmitting plate 120 has the opposite two reflective transmission surfaces 122, 124, wherein the reflective transmission surface 122 of the light-transmitting plate 120 faces the first side S1 of the light-transmitting plate 120 and the reflective transmission surface 124 of the light-transmitting plate 120 faces the second side S2 of the light-transmitting plate 120. Thus, the image beam B emitting from the electronic device 50 projects to the opposite two reflective transmission surfaces 122, 124 of the light-transmitting plate 120 to display an image I on the second side S2 of the light-transmitting plate 120, wherein the image I is the virtual image. In addition, the light-transmitting plate 120 is obliquely arranged in the bottom surface 113 of the box 110. According to the law of reflection, the light-transmitting plate 120 may make the image beam B project to the target 10 passing through the viewing opening 114. Therefore, the users may watch the combined image by the image beam B and the ambient beam E at the same time so as to achieve the effects of the augmented reality.

In order to clearly describe the optical behavior of the image beam B in the embodiment, referring to FIG. 3. In detail, when the image beam B transmits to the light-transmitting plate 120, part of the image beam B is reflected by the reflective transmission surface 122 of the light-transmitting plate 120 to form the image beam B'. The image beam B' reflected by the reflective transmission surface 122 transmits to the target 10 (not shown in FIG. 3, but shown in FIG. 2). On the other hand, part of the image beam B refracts on the reflective transmission surface 122 of the light-transmitting plate 120 and transmits the light-transmitting plate 120 to form the image beam B1. And the image beam B1 continues transmitting to the reflective transmission surface 124 of the light-transmitting plate 120 and reflects by the reflective transmission surface 124 again to form the image beam B2. And then, the image beam B2 continues transmitting to the reflective transmission surface 122 of the light-transmitting plate 120 and refracts on the reflective transmission surface 122 to exit the light-transmitting plate 120 to form the image beam B". The image beam B" transmits to the target 10 again (not shown in FIG. 3, but shown in FIG. 2).

In the embodiment, the reflectivity of any one of the two opposite reflective transmission surfaces 122, 124 of the light-transmitting plate 120 is compliance with the following inequality:

$$R > 3.5\%,$$

and the total reflectivity $R_T$ of the two opposite reflective transmission surfaces 122, 124 of the light-transmitting plate 120 is compliance with the following inequality:

$$R_T > 7\%,$$

wherein R is the reflectivity of any one of the two opposite reflective transmission surfaces 122, 124 of the light-transmitting plate 120, $R_T$ is the total reflectivity of the two opposite reflective transmission surfaces 122, 124 of the light-transmitting plate 120.

As mentioned above, in the embodiment, the refractive index of the light-transmitting plate 120, for example, is greater than 1.4, wherein the material of the light-transmitting plate 120, for example, is polymethyl methacrylate (PMMA), polycarbonate (PC), polyether sulfone (PES) or glass. According to the Fresnel equation, it shows that:

$$R_s = \left| \frac{n_1 \cos \theta_i - n_2 \cos \theta_t}{n_1 \cos \theta_i + n_2 \cos \theta_t} \right|^2 = \left| \frac{n_1 \cos \theta_i - n_2 \sqrt{1 - \left(\frac{n_1}{n_2} \sin \theta_i\right)^2}}{n_1 \cos \theta_i + n_2 \sqrt{1 - \left(\frac{n_1}{n_2} \sin \theta_i\right)^2}} \right|^2$$

$$R_p = \left| \frac{n_1 \cos \theta_t - n_2 \cos \theta_i}{n_1 \cos \theta_t + n_2 \cos \theta_i} \right|^2 = \left| \frac{n_1 \sqrt{1 - \left(\frac{n_1}{n_2} \sin \theta_i\right)^2} - n_2 \cos \theta_i}{n_1 \sqrt{1 - \left(\frac{n_1}{n_2} \sin \theta_i\right)^2} + n_2 \cos \theta_i} \right|^2$$

-continued $$R = \frac{R_s + R_p}{2}$$

The reflectivity R of any one of the two opposite reflective transmission surfaces 122, 124 of the light-transmitting plate 120 is calculated by the aforementioned Fresnel equation, wherein $n_1$ is the refractive index of the material of the light-transmitting plate 120, $n_2$ is the refractive index of the ambient media, $\theta_i$ is the angle of incidence, $\theta_t$ is the angle of refraction, $R_p$ is the reflectivity of the P component in the light beam, $R_S$ is the reflectivity of the S component in the light beam. In the embodiment, the ambient media, for example, is air. When the light beam goes into the light-transmitting plate 120 by 45 degree of the angle of incidence ($\theta_i$), if the refractive index of the ambient media is equal to 1 ($n_1$=1), the refractive index of the material of the light-transmitting plate 120 is equal to 1.4 ($n_2$=1.4), then the reflectivity R of any one of the two reflective transmission surfaces 122, 124 are both 3.5%, so the total reflectivity $R_T$ is 7%. However, the material which the refractive index is greater than 1.4 is easier to obtain. Therefore, the light-transmitting plate 120 which the reflectivity R of any one of the two reflective transmission surfaces 122, 124 is greater than 3.5% and the total reflectivity $R_T$ is greater than 7% is chosen.

In other embodiments which are not shown, the two opposite reflective transmission surfaces 122, 124 of the light-transmitting plate 120 may also be coated with a reflective coating film to make the reflectivity R of any one of the two reflective transmission surfaces 122, 124 greater than 3.5%.

In the embodiment, the brightness of the image beam B providing by the electronic device 50 is approximately within the range of 300 Nits (cd/m$^2$) to 500 Nits (cd/m$^2$). It is taken into consideration that the minimum brightness of the photopic vision for human eyes that may be sensed is 3.4 Nits, and the contrast that may be distinguished by human eyes is approximately 10:1, then the minimum brightness which may clearly display the image is approximately 3.4×10=34 (Nits). If the brightness of the image beam B providing by the electronic device 50 is approximately 500 Nits, the light-transmitting plate 120 which the total reflectivity $R_T$ is greater than 7% is chosen, then it may meet the minimum display condition: 500×7%=35 (Nits). In addition, if the brightness of the image beam B providing by the electronic device 50 is approximately 300 Nits, then the light-transmitting plate 120 which the total reflectivity $R_T$ is much greater than 7% (for example, 12%, but not limited to it) is chosen to meet the minimum display condition. That is to say, when the two opposite reflective transmission surfaces 122, 124 of the light-transmitting plate 120 is in compliance with the aforementioned inequalities, the users may watch the image I formed by the image beam B.

In the embodiment, the thickness of the light-transmitting plate 120, for example, is less than 1 mm. If the thickness of the light-transmitting plate 120 is greater or equal to 1 mm, it will generate multiple images and result in the poor image quality. Therefore, in the embodiment, the thickness of the light-transmitting plate 120 in the display box 100 which is designed as less than 1 mm may avoid the multiple images and have the more excellent image quality.

Next, referring to FIG. 4. In detail, in the embodiment, the pivoting carrier 130 further includes the main body portion 131 and the extension portion 133 extending from the main body portion 131. The main body portion 131 has the accommodating recess 132. The first pivot axis 134 is located between the main body portion 131 and the extension portion 133. When the pivoting carrier 130 rotates by the first pivot axis 134 to make the main body portion 131 contact with the extension portion 133, the electronic device 50 placed in the accommodating recess 132 may face to the users. Therefore, the users may perform operation on the operation interface S of the electronic device 50.

The main body portion 131 is unnecessary to contact with the extension portion 133 to have the users perform operation on the operation interface S of the electronic device 50. Referring to FIG. 2 again, the pivoting carrier 130 rotates by the first pivot axis 134 to make the electronic device 50 cover the top-side opening 112 and to have the location of the pivoting carrier 130 in FIG. 2 be a first location. Referring to FIG. 4 again, the pivoting carrier 130 rotates by the first pivot axis 134 to make the main body portion 131 contact with the extension portion 133 and to have the location of the pivoting carrier 130 in FIG. 4 be a second location. The pivoting carrier 130 may rotate by the first pivot axis 134 to define an operation space (not shown), and the operation space is any location of the pivoting carrier 130 between the first location and the second location. For example, the location of pivoting carrier 130 is shown in FIG. 1. The electronic device 50 placed in the accommodating recess 132 may perform rotation by the pivoting carrier 130 in this operation space to make the electronic device 50 face to the users. The users may perform operation on the operation interface S of the electronic device 50.

It could be known by FIG. 1 to FIG. 4 and the aforementioned paragraphs that the display box 100 of the embodiment makes the electronic device 50 face different positions by disposing the electronic device 50 in the accommodating recess 132 of the pivoting carrier 130 and rotating the pivoting carrier 130 by the first pivot axis 134. According to the different needs of users, the users may make the electronic device 50 face to them by the pivoting carrier 130 and perform operation on the operation interface S, or the users may make the electronic device 50 face to the light-transmitting plate 120 by rotating the pivoting carrier 130 and watch the combined image by the image beam B and the ambient beam E passing through the viewing opening 114 to achieve the effects of the augmented reality. It could be known that the actuation mode of the display box 100 in the embodiment provides the intuitive method of operation for users. Therefore, the display box 100 in the embodiment is easy to operate, and also provides the use of convenience for users.

It should be noted that the following embodiments follow the partial contents of the aforementioned embodiments and the description of the same technical contents is omitted. It may be referred to the partial contents of the aforementioned embodiments regarding to the same element titles. The following embodiments will not describe repeatedly.

Figure 5:
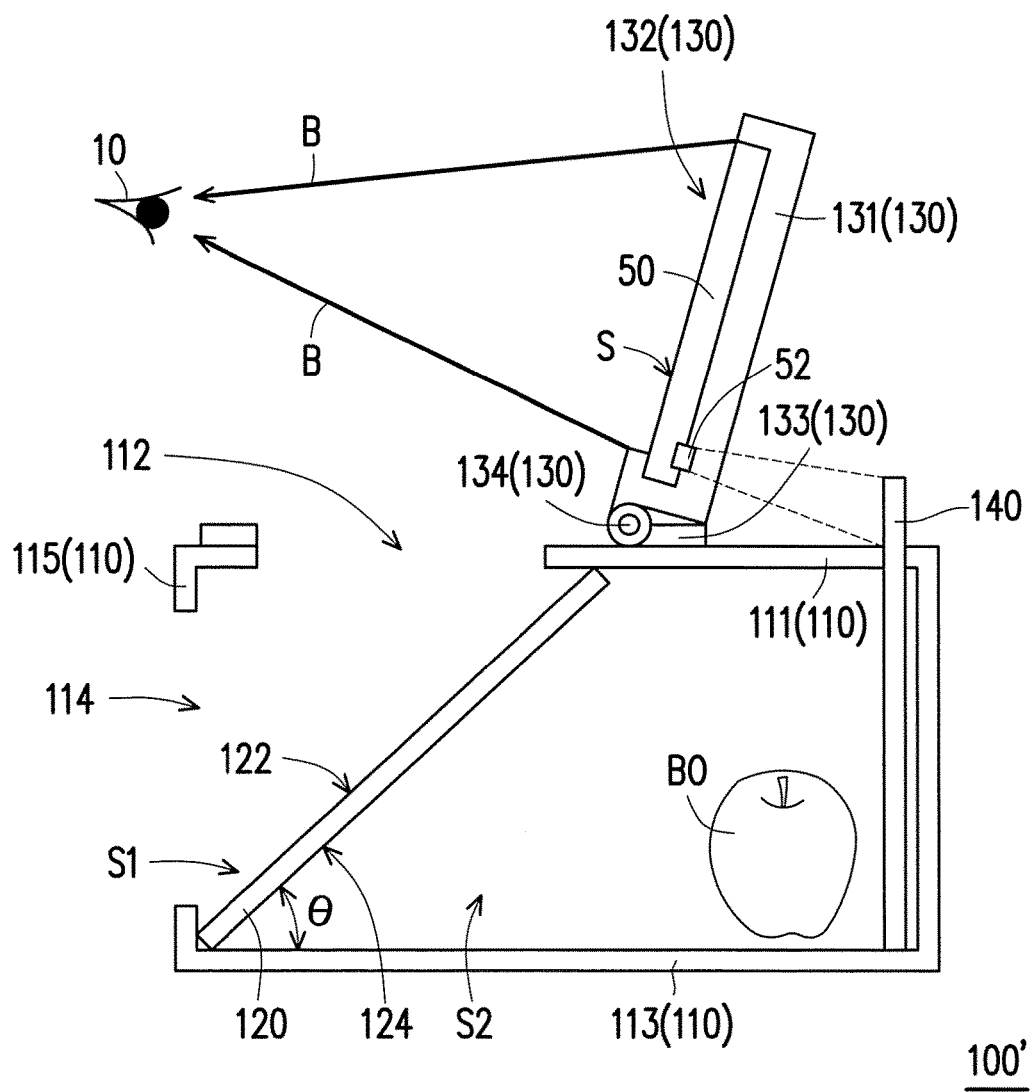
FIG. 5 to FIG. 7 are cross-sectional schematic diagrams of different embodiments of the invention.
Figure 6:
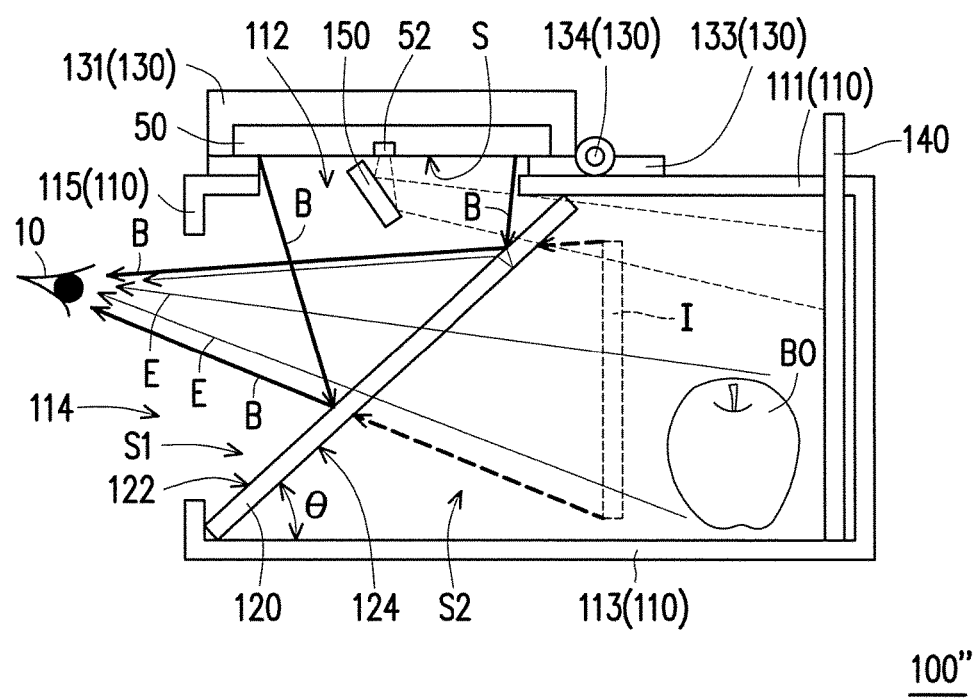
Figure 7:
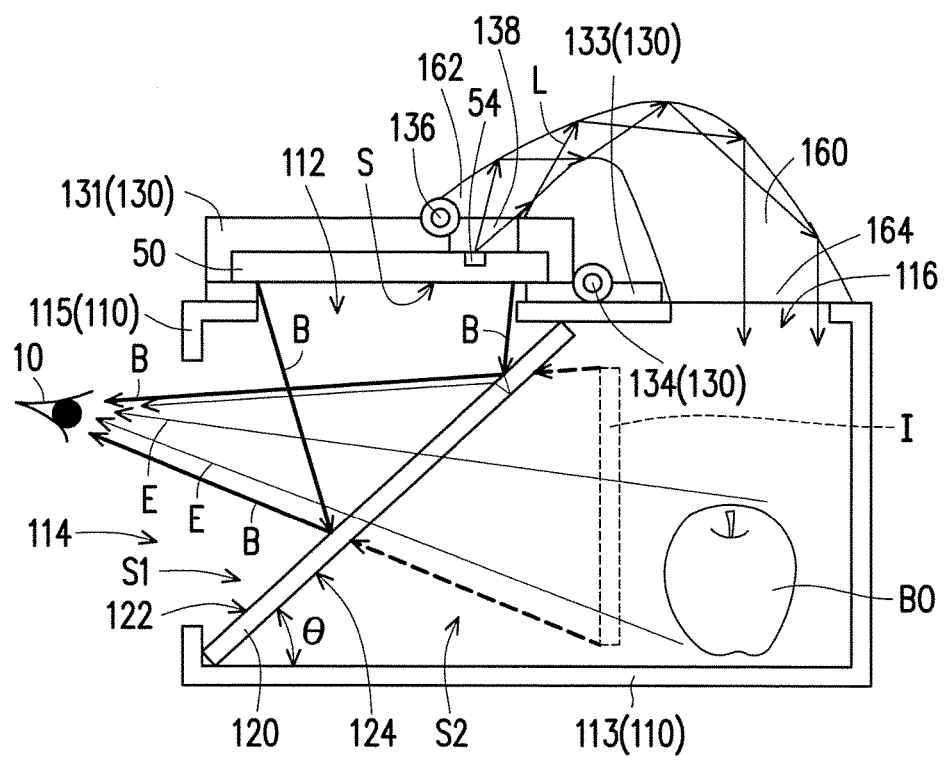

FIG. 5 to FIG. 7 are cross-sectional schematic diagrams of different embodiments of the invention.

The display box 100' shown in FIG. 5 is similar to the display box 100 shown in FIG. 4. The main difference is: the display box 100' further includes an image information element 140. The image information element 140, for example, is a graphic card. The graphic card, for example, is the scene image related to the background object BO. The two-dimensional code, image or other identified pattern which may provide the image capture unit to identify is set on the graphic card. The image information element 140 may be disposed inside the box 110 or outside the box 110. In the embodiment, the image information element 140 is inserted into the box 110 by an insertion hole (not shown) on the box 110, wherein one part of the image information element 140 (such as the scene image) is placed in the box 110 and the other part of the image information element 140 (such as the two-dimensional code, image or other identified pattern) is exposed outside the box 110. On the other hand, the electronic device 50 includes an image capture unit 52. The image capture unit 52, for example, is the back lens of the electronic device 50. When the pivoting carrier 130 rotates by the first pivot axis 134 to make the main body portion 131 contact with the extension portion 133, the image capture unit 52 may capture an image on the image information element 140 (not shown). The distance between the image on the image information element 140 and the image capture unit 52, for example, is the focal distance of the image capture unit 52. As a result, the users may directly have the pivoting carrier 130 rotated by the first pivot axis 134 to make the main body portion 131 contact with the extension portion 133 and make the image capture unit 52 focus on the image which is on the part of the image information element 140 exposed outside the box 110. This design may make the focal distance of the image capture unit 52 fixed and provide the intuitive method of operation for users. It may efficiently make the electronic device 50 identify the information on the image information element 140.

As described above, in the embodiment, the electronic device 50 further includes a controller (not shown). The controller reads the image captured from the image capture unit 52 and makes the electronic device 50 generate the image beam B corresponding to the image contents for users to watch. The image beam B providing by the electronic device 50, for example, is the dynamic image or the static image. Therefore, when the electronic device 50 rotates by the pivoting carrier 130 to face the light-transmitting plate 120, the users may simultaneously watch the ambient images of the real environment from the scene image of the background object BO and the image information element 140 and the virtual images of the image beam B which is generated by the electronic device 50 corresponding to the image of the image information element 140 to achieve the effects of the augmented reality. In addition, the background object BO and the image information element 140 may have multiple choices respectively. The users may choose different background object BO and image information element 140 according to their needs.

In other embodiments (not shown), the image information element 140, for example, is disposed outside the box 110. The users may adjust the distance of the image capture unit 52 and the image information element 140 by the pivoting carrier 130 rotating through the first pivot axis 134 and make the image capture unit 52 focuses on the image of the image information element 140. The invention is not intended to limit the location of the image information element 140.

Referring to FIG. 6. The display box 100" shown in FIG. 6 is similar to the display box 100 shown in FIG. 2. The main difference is: the display box 100" further includes a reflective element 150. The reflective element 150, for example, is a mirror. The image capture unit 52, for example, is a front lens of the electronic device 50. When the pivoting carrier 130 rotates by the first pivot axis 134 to make the electronic device 50 face the light-transmitting plate 120 (for example, the pivoting carrier 130 rotates by the first pivot axis 134 to make the electronic device 50 cover the top-side opening 112), the image capture unit 52 of the electronic device 50 is capable of capturing the image on the image information element 140 disposed inside the box 110. The reflective element 150 disposed on the transmission path of the image, and the reflective element 150 is capable of reflecting the image on the image information element 140 to the image capture unit 52. In particular, the reflective element 150 is disposed inside the box 110 and adjacent to the top-side opening 112. The distance between the image on the image information element 140 and the image capture unit 52, for example, is the focal distance of the image capture unit 52. As a result, the users may directly have the pivoting carrier 130 rotated by the first pivot axis 134 to make the electronic device 50 cover the top-side opening 112 and make the image capture unit 52 focus on the image of the image information element 140. Similarly, this design may make the focal distance of the image capture unit 52 fixed and provide the intuitive method of operation for users. It may efficiently make the electronic device 50 identify the information on the image information element 140.

As described above, in the embodiment, the controller reads the image captured from the image capture unit 52 to make the electronic device 50 generate the image beam B corresponding to the image contents. The image I formed by the image beam B passing through the light-transmitting plate 120 also includes this image contents. Therefore, the users may watch the combined dynamic images or static images by the image beam B and the ambient beam E at the same time so as to achieve the effects of the augmented reality. Furthermore, when the users change the image information element 140, the combined dynamic images or static images by the image beam B and the ambient beam E may be changed.

In other embodiments (not shown), the image information element 140, for example, is only disposed inside the box 110 and not exposed outside the box 110, the invention is not limited thereto.

Referring to FIG. 7. The display box 100''' shown in FIG. 7 is similar to the display box 100 shown in FIG. 2. The main difference is: the display box 100''' further includes a light guide body 160. The light guide body 160, for example, is light guide bar or optical fiber. The pivoting carrier 130 further includes a second pivot axis 136 and a light-transmitting opening 138. The light guide body 160 is pivoted to the pivoting carrier 130 by the second pivot axis 136. An illumination beam L coming from the electronic device 50 may transmit to the box 110 by the light-transmitting opening 138 of the pivoting carrier 130 and the light guide body 160.

In detail, the box 110 further includes the fill-light opening 116. The light guide body 160 has a opposite first end 162 and a second end 164 opposite to the first end 162. The first end 162 is adjacent to the second pivot axis 136. The second end 134 is adjacent to the fill-light opening 116. The pivoting carrier 130 rotates by the second pivot axis 136 to make the second end 164 of the light guide body 160 cover the fill-light opening 116. The illumination beam L coming from the electronic device 50 performs one or more times of total reflection in the light guide body 160 and exits through the second end 164 of the light guide body 160 to make the illumination beam L transmit to the background object BO in the box 110. In the embodiment, the source of the illumination beam L, for example, is the fill-light lamp 54 from the electronic device 50. Therefore, the display box 100''' may lead the illumination beam L providing by the fill-light lamp 54 originally on the electronic device 50 into the display box 100''' and further transmit to the background object BO. As a result, because of the illumination beam L, the light intensity of the illumination beam L coming from the background object BO enhances. The brightness of the combined image by the image I and the ambient beam E that the users watch is more consistent. The display box 100''' in the embodiment has the excellent image quality. In addition, since it is unnecessary to dispose additional light source or power for the display box 100''' in the embodiment, the production costs may be reduced and the manufacturing process of the display box may be simplified.

Moreover, in an embodiment (not shown), if the power of the electronic device 50 is too low that the fill-light lamp 54 may not provide the illumination beam L, the users may also rotate the pivoting carrier 130 by the second pivot axis 136 to separate the second end 164 of the light guide body 160 and the fill-light opening 116. An external light source may transmit to the background object BO in the box 110 by the fill-light opening 116 make the light intensity of the ambient beam E coming from the background object BO enhanced. The brightness of image combined by the image I and the ambient beam E that the users watch is more consistent. In other words, it is not intent to limit the illumination beam L coming from the electronic device 50 to provide the light beam for background object BO, it may come from the external light source as well. In addition, the image information element 140 may also be disposed in the display box 100''' of the embodiment shown in FIG. 7. Using the approaches of embodiments in FIG. 5 or FIG. 6 to capture the image on the image information element 140 may achieve the same effects. It will not describe repeatedly.

In summary of above, the plurality of aforementioned embodiments in the invention have at least one of the advantages or effects below. The display box of the plurality of aforementioned embodiments in the invention makes the electronic device disposed in accommodating recess of the pivoting carrier and also makes the electronic device face different positions by rotating the pivoting carrier through the first pivot axis. According to the different needs of users, the users could achieve different effects (for example, performing operation or augmented reality to the electronic device) by rotating the pivoting carrier to make the electronic device face different positions. The actuation mode of the display box as the aforementioned plurality of the embodiments in the invention provides the intuitive method of operation for users. Therefore, the display box of the aforementioned plurality of the embodiments in the invention is easy to operate and also provides the use of convenience for users.

In addition, in the aforementioned plurality of the embodiments of the invention, the display box further includes an image information element. When the pivoting carrier rotates by the first pivot axis to make the main body portion contact with the extension portion, the image capture unit of the electronic device focuses on the image of the image information element. Or, the display box includes an image information element and a reflective element. The reflective element is disposed on the transmission path of the image. When the pivoting carrier rotates by the first pivot axis to make the electronic device face to the light-transmitting plate, the image of the image information element transmits by the reflective element to the image capture unit of the electronic device. The aforementioned design may make the focal distance of the image capture unit fixed and provide the intuitive method of operation for users. It may efficiently make the electronic device identify the information on the image information element.

In addition, in the aforementioned plurality of the embodiments of the invention, the display box includes a light guide body. The electronic device includes the fill-light lamp. The display box may lead the illumination beam providing by the fill-light lamp originally on the electronic device into the display box and further transmit to the background object. As a result, the light intensity of the ambient beam coming from the background object enhances. The brightness of image combined by the image and the ambient beam that the users watch is more consistent. Therefore, in the aforementioned plurality of the embodiments of the invention, the display box has the excellent image quality. In addition, since it is unnecessary to dispose additional light source or power, the production costs of the display box in the aforementioned plurality of the embodiments of the invention may be reduced and the manufacturing process is simple.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display box, capable of supporting an electronic device, the electronic device capable of emitting an image beam, the display box comprising:
    a box, having a top-side opening and a viewing opening;
    a light-transmitting plate, obliquely arranged in the box and capable of reflecting the image beam passing through the viewing opening to a target; and
    a pivoting carrier, having an accommodating recess and a first pivot axis, disposed on the box, the pivoting carrier pivoted beside the top-side opening by the first pivot axis, the electronic device disposed in the accommodating recess,
    wherein the pivoting carrier rotates by the first pivot axis to make the electronic device face different positions.

2. The display box as recited in claim 1, wherein the pivoting carrier rotates by the first pivot axis to make the electronic device cover the top-side opening.

3. The display box as recited in claim 1, wherein the light-transmitting plate is capable of combining the image beam and an ambient beam, when the pivoting carrier rotates by the first pivot axis to make the electronic device face the light-transmitting plate, the light-transmitting plate projects the image beam and the ambient beam to the target.

4. The display box as recited in claim 1, wherein the display box further comprises a light guide body, the pivoting carrier further comprises a second pivot axis, the light guide body is pivoted to the pivoting carrier by the second pivot axis, wherein an illumination beam from the electronic device transmits to the box by the light guide body.

5. The display box as recited in claim 4, wherein the light guide body is light guide bar, the illumination beam from the electronic device performs one or more times of total reflection in the light guide body to transmit to the box.

6. The display box as recited in claim 1, wherein the reflectivity of any one of two opposite reflective transmission surfaces of the light-transmitting plate is compliance with the following inequality:

$$R > 3.5\%,$$

and the total reflectivity $R_T$ of the two opposite reflective transmission surfaces of the light-transmitting plate is compliance with the following inequality:

$$R_T > 7\%,$$

wherein R is the reflectivity of any one of the two opposite reflective transmission surfaces of the light-transmitting plate, $R_T$ is the total reflectivity of the two opposite reflective transmission surfaces of the light-transmitting plate.

7. The display box as recited in claim 1, wherein the refractive index of the light-transmitting plate is greater than 1.4.

8. The display box as recited in claim 1, wherein the display box further comprises an image information element, the image information element is disposed inside the box or outside the box, wherein the electronic device comprises an image capture unit, the image capture unit is capable of capturing an image on the image information element.

9. The display box as recited in claim 8, wherein the display box further comprises a reflective element, when the pivoting carrier rotates by the first pivot axis to make the electronic device face the light-transmitting plate, the image capture unit of the electronic device is capable of capturing the image on the image information element disposed inside the box, wherein the reflective element is disposed on the transmission path of the image, and the reflective element is capable of reflecting the image to the image capture unit.

10. The display box as recited in claim 8, wherein the pivoting carrier further comprises a main body portion and an extension portion extending from the main body portion, the main body portion has the accommodating recess, the first pivot axis is located between the main body portion and the extension portion, wherein when the pivoting carrier rotates by the first pivot axis to make the main body portion contact with the extension portion, the image capture unit is capable of capturing the image on the image information element disposed outside the box.

* * * * *